Dec. 1, 1964   L. B. THWAITES   3,159,229
ARTICULATED CHASSIS FOR A VEHICLE
Filed Jan. 31, 1962   3 Sheets-Sheet 1

Dec. 1, 1964   L. B. THWAITES   3,159,229
ARTICULATED CHASSIS FOR A VEHICLE
Filed Jan. 31, 1962   3 Sheets-Sheet 3

United States Patent Office 3,159,229
Patented Dec. 1, 1964

3,159,229
ARTICULATED CHASSIS FOR A VEHICLE
Leslie Basil Thwaites, % The Thwaites Engr. Co. Ltd.,
Welch Road Works, Cubbington, near Leamington Spa,
England
Filed Jan. 31, 1962, Ser. No. 170,217
Claims priority, application Great Britain, Apr. 13, 1961,
13,269/61
5 Claims. (Cl. 180—51)

The invention relates to a vehicle chassis provided with front and rear pairs of power-driven wheels respectively supported from front and rear chassis portions which are capable of being relatively articulated whereby to steer the vehicle, and it has particular, but not exclusive, reference to a vehicle such as a dumper or forklift truck. The main object of the invention is to enable such a vehicle to be steered without differential slip between the front and rear wheels, and the consequent risk of their respective drives becoming "wound-up" due to steering.

According to the invention a vehicle chassis includes a front portion and a rear portion, each provided with a pair of coaxial ground wheels, one of the chassis portions being pivotally supported for lateral tilting, on its fore-and-aft axis, from a bridge member which is pivotally connected to the other chassis portion to allow the chassis portions to be articulated about an axis which is equidistant from the wheel axes for steering purposes, the wheels of each pair being interconnected by a respective differential drive transmission gearing, the differential drive transmission gearings having their input shafts interconnected by a drive transmission arrangement so that a power plant, mounted on one of the chassis portions and connected to drive the adjacent input shaft, will drive all the ground wheels, means being provided for reacting between the bridge member and the said other portion whereby the chassis portions may be articulated for the said steering purposes.

According to one feature, the drive transmission arrangement is a torque transmitting shaft connected at its ends to the said two input shafts by respective universal joints, a portion of the said shaft being capable of limited telescopic movement in the direction of its axis.

According to another feature the said means for reacting between the bridge member and the said other portion is a double-acting, fluid-operable ram the effective length of which is controllable for regulating the attitude of the two pairs of wheels for steering purposes. In such a case the ram may be controlled by a valve operable through means associated with a conventional steering column and being for selectively connecting one end of the ram to a supply of working fluid and the other end to an exhaust, whereby the effective length of the ram is appropriately altered in response to an steering movement transmitted by the steering column to steer the said ground wheels. The steering column and a valve operating linkage may be mounted, one on the bridge member and the other on the said other chassis portion, the control member of the steering column being arranged so that it moves in a direction at least substantially longitudinally of the chassis frame, the valve including a body portion and a valve control member which are operatively connected, one to the said steering column control member and the other to the said valve operating linkage so that, when the steering column control member is moved, the valve control member is moved relatively to the valve body portion whereby to alter the setting of the valve and thus to actuate the said ram, the valve being so arranged that it will alter the effective length of the ram, in such a way that the latter will articulate the bridge member and the said other chassis portion to restore the valve to its initial position, and, after being restored to its initial position, will hold the ram at its altered length unless further steering movements are signalled by the steering column control member. In such a case the control member of the steering column may carry the valve body, and the valve operating linkage is operatively connected to the valve control member, the valve operating linkage including one link connected through a ball-joint to either the said bridge member or to the said other chassis portion, as appropriate.

According to yet another feature the bridge member extends over, or under, the said one portion, and is pivotally connected to it at two different positions lying on the said fore-and-aft axis.

According to a further feature the said one portion carries the propulsion power plant and the bridge member rigidly supports the steering column and a seat for a driver.

According to a still further feature the propulsion power plant is arranged with a change-speed gearbox on the same chassis portion, the input shaft of the gearbox being parallel to and spaced from the output shaft of the power plant by which it is driven through a first transmission gearing, the output shaft of the gearbox being connected by a second transmission gearing to drive the input shaft of the adjacent pair of coaxial ground wheels. In such a case either or both of the first and second transmission gearings may be of the sprocket and chain type.

By mounting the power plant (e.g., an engine, change-speed gearbox, and clutch) on the said one chassis portion not only is it simple to drive the associated pair of wheels without unduly limiting their ability to tilt laterally, but the centre of gravity of those elements is kept low, and the drive transmission arrangement (e.g., a torque transmitting shaft) between the two differential drive transmission gearings can be arranged at a low level to pass, with clearance, beneath the pivotal interconnection of the bridge member and the said other chassis portion. This provides a high degree of stability owing to the low weight distribution over the said one chassis portion, and also permits the driver's seat to be arranged at a low level and in such a position that the driver's weight will, at least to a qualified extent, counterbalance the weight of the power plant for equally distributing the weight on the wheels of the said portion, this being an important factor when the dumper is travelling over rough ground in light-load conditions.

An embodiment of the invention, as specifically applied to a dumper, is described with reference to the accompanying drawings, in which.

Figure 1:
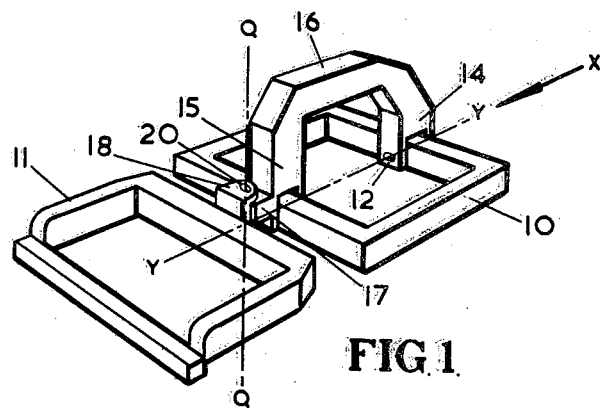
FIGURE 1 is a perspective view of the dumper chassis frame.

In the construction shown, the said one portion 10 is at the rear and the said other portion 11 at the front. The rear portion 10 is pivoted about a fore-and-aft axis Y—Y by trunnions 12, 13 in the respective limbs 14, 15 of the bridge member 16 which is of inverted U-form. The front limb 15 of the bridge member 16 has a forwardly-extending part 17 which is pivotally connected, on a vertical axis Q—Q, to the front portion 11 by means of a pair of jaws 18, 19 and a pivot pin 20.

Figure 2:
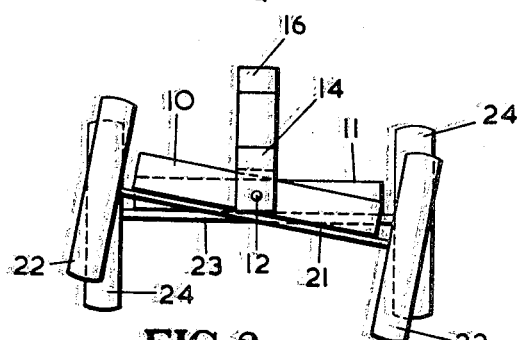
FIGURE 2 is an end view, as if taken in the direction of arrow X in FIGURE 1, but showing the wheels and indicating the lateral tilting.

The rear portion 10 carries a differential gearing axle 21 with ground-engaging driving wheels 22, 22 and the front portion 11 carries a differential gearing axle 23 with ground-engaging driving wheels 24, 24. Due to the pivot axis Y—Y the axle 21 can tilt laterally relatively to the axle 23 for enabling all four driving wheels 22, 22, 24, 24 to engage the ground when the dumper is passing over a rough terrain (see FIGURE 2).

Figure 3:
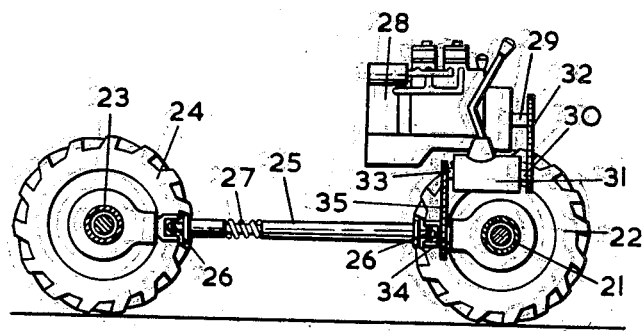
FIGURE 3 is a longitudinal section through the drive transmission.

As will best be seen from FIGURE 3, the input shafts of the axles 21 and 23 are joined together by a torque transmitting shaft 25 and two universal joints 26, 26, the shaft 25 being provided with limited telescopic movement in the direction of its axis by means of a spline and coil spring arrangement 27. The power plant is a twin cylinder diesel engine 28 having its output shaft 29 parallel with the input shaft 30 of the gearbox 31. The engine drives the input shaft 30 through a first chain and sprocket transmission gearing 32, and the output shaft 33 of the gearbox drives a sprocket 34, on the input shaft of axle 21, of a second chain and sprocket transmission gearing 35. The axle 21, gearbox 31 and power plant 28 are mounted on rear portion 10 with clearance from the bridge member 16 whereby to allow relative rolling between the axles 21, 23.

Figure 4:
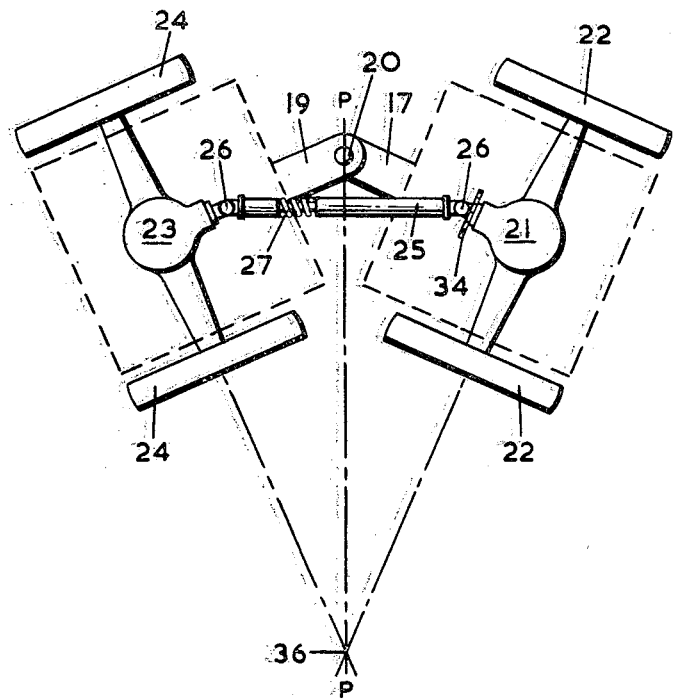
FIGURE 4 is a diagrammatic under plan view showing the steering geometry.
Figure 5:
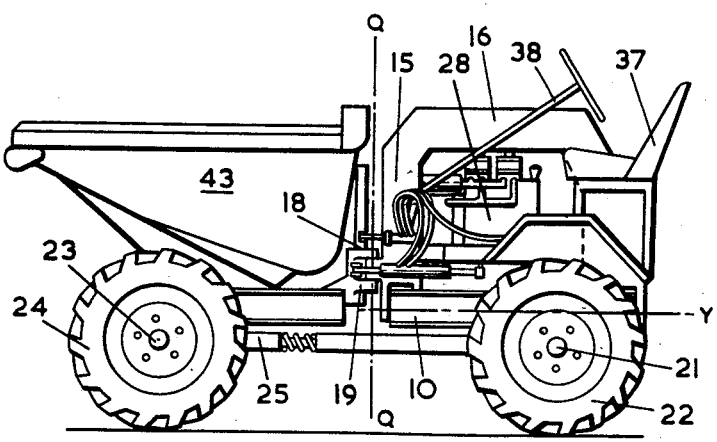
FIGURE 5 is a side elevation of the dumper.
Figure 6:
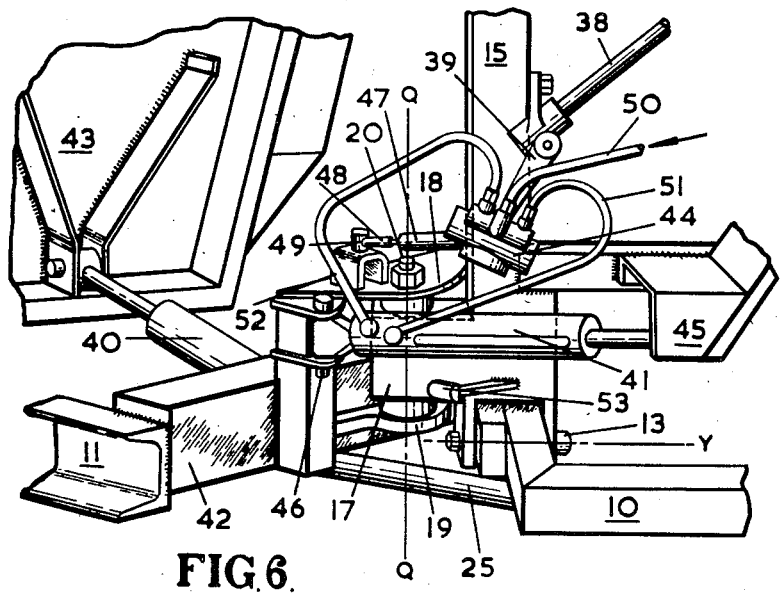
FIGURE 6 is a perspective view, to an enlarged scale, of the central portion of FIGURE 5 and illustrating a steering movement.

By arranging the pivot pin 20 to be equidistant from the axes of ground wheels 22, 22 and 24, 24 (see FIGURE 4) the vehicle will steer about a point lying on the line P—P, for instance, point 36. It will be seen that, provided axles 21 and 23 have the same track and the wheels are of the same diameter, the inside wheels 22 and 24 will run at the same speed as each other and so will the outside wheels 22 and 24. There is therefore no tendency for the front wheels 24, 24 to run faster than the back wheels 22, 22 when the vehicle is cornering and thus the coupling together of axles 21, 23 by a single shaft 25 is justifiable. Additionally the avoidance of differential slipping prevents the drives to the wheels from winding-up.

A seat 37 for the driver, and a steering column 38 are provided on the bridge member 16 and the steering column is so arranged that the steering control drop arm 39, will move in a direction substantially longitudinally of the rear portion 10. The power plant 28 drives a pump (not shown) which supplies working fluid under pressure for the tipping ram 40 and the double-acting steering ram 41. The tipping ram 40 reacts, when actuated by a control (not shown), between a cross-member 42 of the front portion 11 and the dumper skip 43 whereby to tip the latter, and the steering ram 41 reacts, when actuated by valve 44 (to be described later), between a portion 45 of the bridge member 16 and a pivotal connection 46 on the cross-member 42 whereby to articulate the chassis portions 10, 11.

The body of valve 44 is carried by the drop arm 39, and the valve control member 47 is connected through a link 48 and a ball-joint 49 to the jaw 18 carried by the front portion 11. The supply of working fluid is conveyed to the valve 44 through a pipe 50, and the valve is so arranged that it can direct the working fluid either into pipe 51 or pipe 52, using the other pipe 52, 51 (as appropriate) as a return path, whereby to make the ram 41 articulate the chassis portions 10, 11 either in one direction or the other. The valve may be of any suitable design and the one shown is conveniently arranged to connect the pipes 51 and 52 selectively to the supply 50 and exhaust in such a manner that the valve body is moved by the articulation of the chassis portions 10, 11, caused by the ram 41, into a stable position relatively to the ball-joint 49. Thus it will be seen that movement of the steering arm 39 will displace the valve body away from the said stable position, in which the valve 44 connects neither pipe 51 nor pipe 52 to the supply 50, and the valve will actuate the ram 41 in such a direction as to return itself to the said stable position by relatively articulating the chassis portions. It will readily be appreciated that the large forces required to hold the articulated chassis in any position are taken solely by the ram 41, and that the steering column is only used for displacing the valve 44 from its stable position relatively to the front portion 11.

Stops 53, only one of which is shown can conveniently be provided for coacting with the cross-member 42 whereby to limit the extent to which the chassis portions 10, 11 may be articulated.

The bridge member 16, instead of extending over the rear chassis portion 10, may extend under or around the portion 10 provided that there is sufficient clearance for lateral tilting. The engine and skip may exchange places provided that the steering ram 41, or any suitable steering means that may be used, is arranged to react directly between the said other portion 10 and the bridge member 16.

What I claim as my invention and desire to secure by Letters Patent of the United States is:

1. A vehicle chassis comprising a front portion, a rear portion, and a bridge member interconnecting said front and rear portions, said front portion and said rear portion provided respectively with a pair of coaxial ground wheels, said bridge member comprising a rigid central portion with a respective rigid downwardly-extending arm at each of its ends, one of said arms pivoted on a vertical axis from one of said chassis portions whereby said portions can be articulated about the said vertical axis for steering purposes, the vertical axis being equi-distant from the axes of said pairs of ground wheels, the other chassis portion pivoted between said arms of said bridge member on a longitudinal axis whereby said other chassis portion can tilt laterally with respect to said bridge member and to said one chassis portion to cater for irregularities in the surface of the ground, a respective differential drive transmission gearing interconnecting the ground wheels of each said pair, said differential drive transmission gearings having respective input shafts, a torque transmitting shaft, universal joints respectively interconnecting the ends of said torque transmitting shaft to said input shafts, said torque transmitting shaft comprising telescopable portions, a power plant mounted on said other chassis portion, said power plant having a power output shaft, means connecting said output shaft to drive the input shaft of the adjacent differential drive transmission gearing and thereby to drive the input shaft of the other differential drive transmission gearing through said torque transmitting shaft and universal joints, and means reacting between said bridge member and said one chassis portion for relatively articulating them about said steering axis.

2. A vehicle chassis comprising a front portion, a rear portion, and a bridge member interconnecting said front and rear portions, said front portion and said rear portion provided respectively with a pair of coaxial ground wheels, said bridge member comprising a rigid central portion with a respective rigid downwardly-extending arm at each of its ends, one of said arms pivoted on a vertical axis from one of said chassis portions whereby said portions can be articulated about the said vertical axis for steering purposes, the vertical axis being equi-distant from the axes of said pairs of ground wheels, the other chassis portion pivoted between said arms of said bridge member on a longitudinal axis whereby said other chassis portion can tilt laterally with respect to said bridge member and said one chassis portion to cater for irregularities in the surface of the ground, a respective differential drive transmission gearing interconnecting the ground wheels of each said pair, said differential drive transmission gearings having respective input shafts, a torque transmitting shaft, universal joints respectively interconnecting the ends of said torque transmitting shaft to said input shafts, said torque transmitting shaft comprising telescopable portions, a power plant mounted on said other chassis portion, said power plant having a power output shaft, means connecting said output shaft to drive the input shaft of the adjacent differential drive transmission gearing and thereby to drive the input shaft of the other differential drive transmission gearing through said torque transmitting shaft and universal joints, and means reacting between said bridge member and said one chassis portion for relatively articulaing them about siad steering axis, and a driver's seat mounted from said bridge member.

3. A vehicle chassis comprising a front portion, a rear portion, and a bridge member interconnecting said front and rear portions, said front portion and said rear portion provided respectively with a pair of coaxial ground wheels, said bridge member comprising a rigid central portion with a respective rigid downwardly-extending arm at each of its ends, one of said arms pivoted on a vertical axis from one of said chassis portions whereby said portions can be articulated about the said vertical axis for steering purposes, the vertical axis being equi-distant from the axes of said pairs of ground wheels, the other chassis portion pivoted between said arms of said bridge member on a longitudinal axis whereby said other chassis portion can tilt laterally with respect to said bridge member and said one chassis portion to cater for irregularities in the surface of the ground, a respective differential drive transmission gearing interconnecting the ground wheels of each said pair, said differential drive transmission gearings having respective input shafts, a drive transmission arrangement drivingly interconnecting said input shafts, a power plant mounted on said other chassis portion, said power plant having a power output shaft, a change-speed gearbox mounted on said other chassis portion, said change-speed gearbox having input and output shafts parallel to said power output shaft of said power plant, a first transmission gearing interconnecting said power output shaft of said power plant and said input shaft of said gearbox, a second transmission gearing interconnecting said output shaft of said gearbox and the input shaft of the adjacent differential drive transmission gearing to drive to same and to drive the input shaft of the other differential drive transmission gearing through said drive transmission arrangement, and means reacting between said bridge member and said one chassis portion for relatively articulating them about said steering axis.

4. A vehicle chassis according to claim 3 in which the first transmission gearing is a drive transmission chain and sprocket arrangement.

5. A vehicle chassis according to claim 3 in which the second transmission gearing is a drive transmission chain and sprocket arrangment.

References Cited by the Examiner
UNITED STATES PATENTS

| | | | |
|---|---|---|---|
| 1,623,214 | 4/27 | Storey | 180—50 |
| 2,835,397 | 5/58 | Wayner. | |
| 2,941,612 | 6/60 | Bermotas | 180—51 |
| 3,007,590 | 11/61 | Matthew et al. | 180—51 X |
| 3,017,945 | 1/62 | MacDuff | 180—79.2 |

A. HARRY LEVY, *Primary Examiner.*